(12) United States Patent
Bihari

(10) Patent No.: US 9,647,504 B2
(45) Date of Patent: May 9, 2017

(54) INTERPHASE INSULATOR

(71) Applicant: TM4 Inc., Boucherville (CA)

(72) Inventor: Gyula Bihari, Montréal-Nord (CA)

(73) Assignee: TM4 Inc., Boucherville (CA)

( * ) Notice: Subject to any disclaimer, the term of this patent is extended or adjusted under 35 U.S.C. 154(b) by 268 days.

(21) Appl. No.: 14/386,612

(22) PCT Filed: Mar. 14, 2013

(86) PCT No.: PCT/CA2013/000227
§ 371 (c)(1),
(2) Date: Sep. 19, 2014

(87) PCT Pub. No.: WO2013/138901
PCT Pub. Date: Sep. 26, 2013

(65) Prior Publication Data
US 2015/0048709 A1    Feb. 19, 2015

Related U.S. Application Data

(60) Provisional application No. 61/613,634, filed on Mar. 31, 2012.

(51) Int. Cl.
*H02K 1/04* (2006.01)
*H02K 3/34* (2006.01)
*H02K 3/38* (2006.01)

(52) U.S. Cl.
CPC .............. *H02K 3/34* (2013.01); *H02K 1/04* (2013.01); *H02K 3/345* (2013.01); *H02K 3/38* (2013.01)

(58) Field of Classification Search
CPC H02K 1/04; H02K 3/34; H02K 3/345; H02K 3/38
(Continued)

(56) References Cited

U.S. PATENT DOCUMENTS

| 1,480,412 A | * | 1/1924 | Parsons | H02K 3/38 310/260 |
| 3,576,623 A | * | 4/1971 | Stine | G03G 9/12 399/240 |

(Continued)

FOREIGN PATENT DOCUMENTS

| EP | 1073180 | 1/2001 |
| JP | 2004166476 | 6/2004 |

(Continued)

OTHER PUBLICATIONS

International Search Report and Written Opinion dated May 31, 2013, issued in connection with related PCT/CA2013/000227, filed Mar. 14, 2013.

(Continued)

*Primary Examiner* — John K Kim
(74) *Attorney, Agent, or Firm* — Downs Rachlin Martin PLLC

(57) ABSTRACT

Electrically insulating material so foldable as to form an interphase insulator so configured as to be inserted in the slots of the stator or the rotor of an electric machine to prevent separate coils inserted in the same slot to be in direct contact with one another and to prevent the coil heads of different coils to be in direct contact is described herein. The interphase insulator may be so folded that the coil heads are properly insulated from one another.

13 Claims, 10 Drawing Sheets

(58) Field of Classification Search
USPC .................................... 310/215, 260, 270
IPC .................................. H02K 1/04, 3/34, 3/38
See application file for complete search history.

(56) References Cited

U.S. PATENT DOCUMENTS

| | | | |
|---|---|---|---|
| 4,403,162 A * | 9/1983 | Pallaro | H02K 3/38 |
| | | | 310/194 |
| 5,659,219 A * | 8/1997 | Momose | H02K 3/38 |
| | | | 29/596 |
| 6,043,584 A | 3/2000 | Dehart | |
| 9,124,158 B2 * | 9/2015 | Coldwate | H02K 3/30 |
| 2004/0056558 A1 | 3/2004 | Tagami et al. | |
| 2005/0168097 A1 | 8/2005 | Takizawa et al. | |
| 2009/0189476 A1 * | 7/2009 | Takizawa | H02K 3/38 |
| | | | 310/215 |
| 2015/0048709 A1 * | 2/2015 | Bihari | H02K 3/34 |
| | | | 310/195 |

FOREIGN PATENT DOCUMENTS

| | | |
|---|---|---|
| JP | 2006109615 | 4/2006 |
| WO | 9101585 | 2/1991 |

OTHER PUBLICATIONS

European Search Report dated Mar. 10, 2016, in connection with EP13763884.7.

* cited by examiner

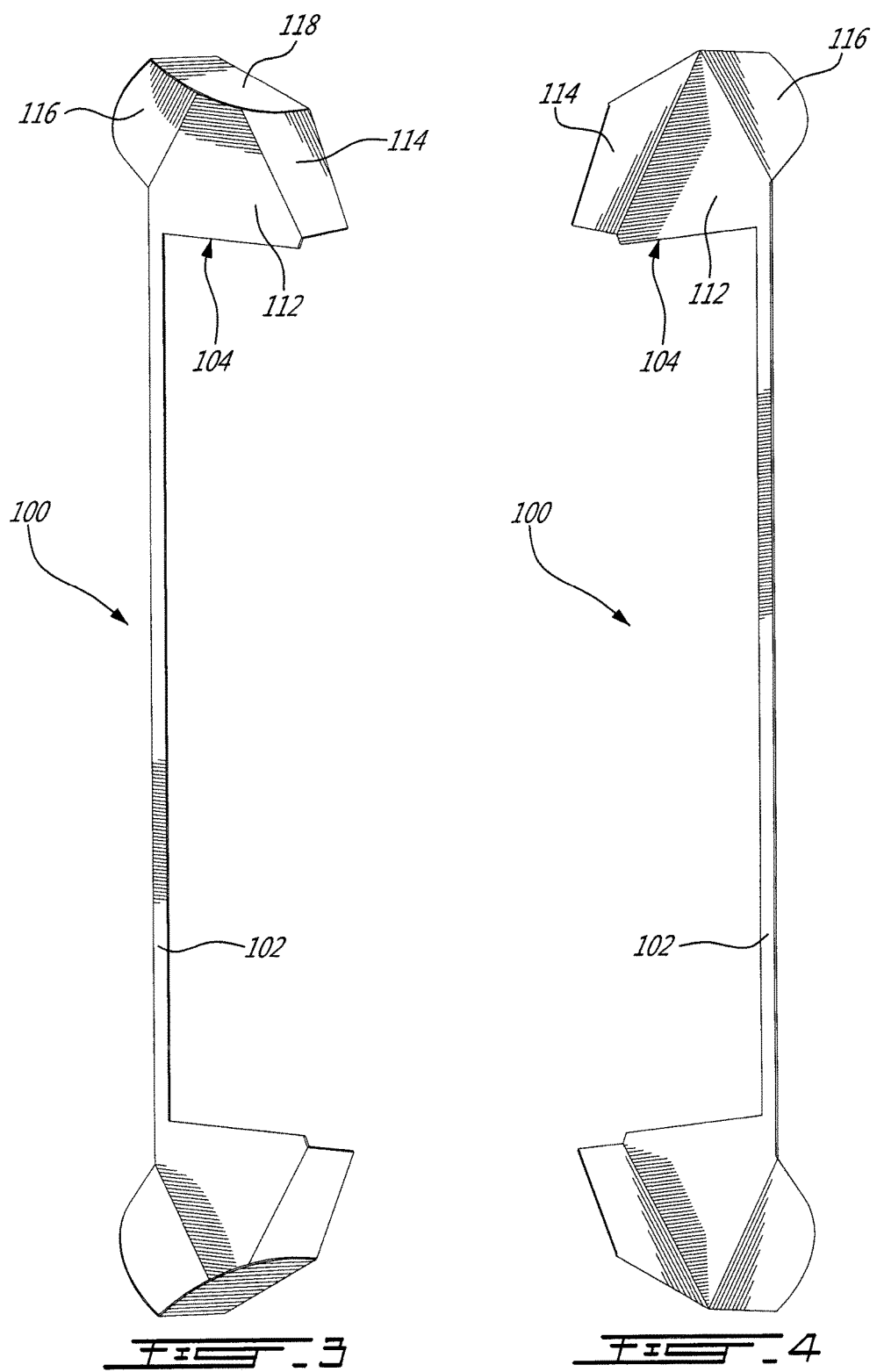

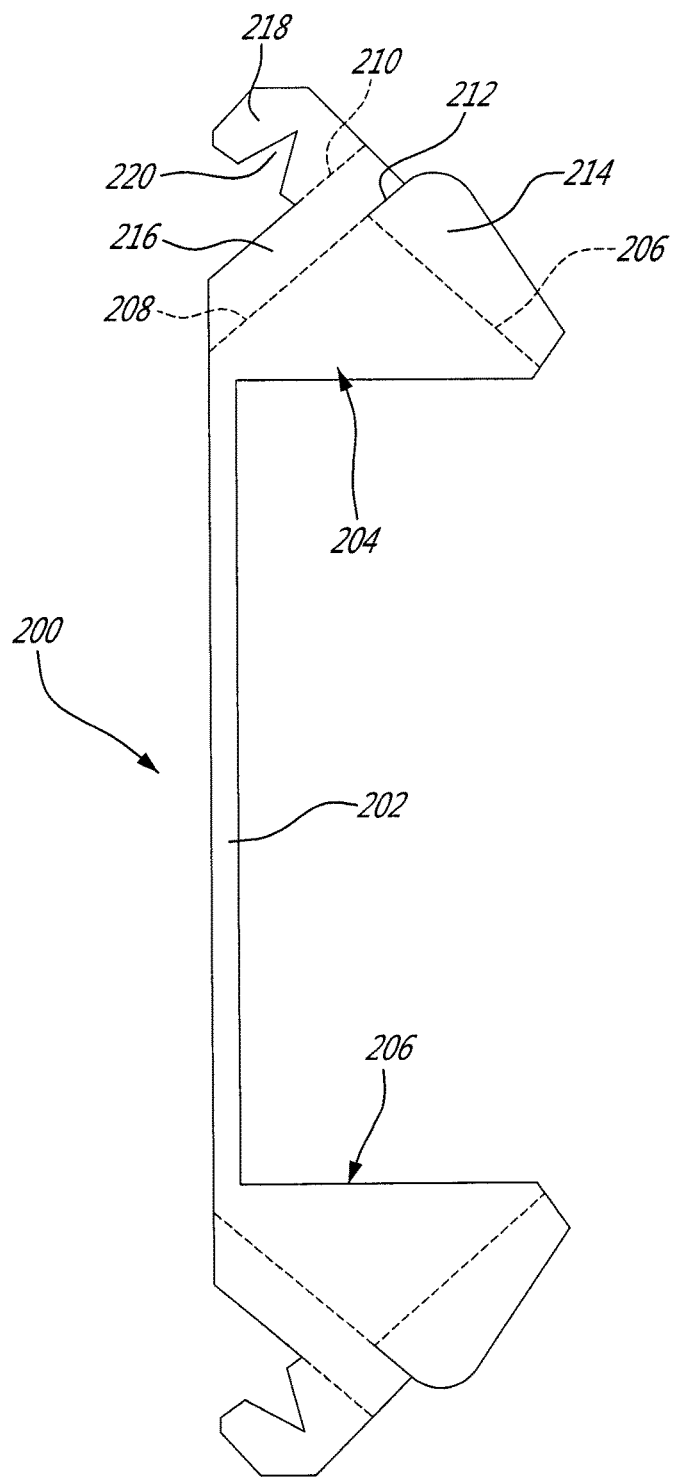

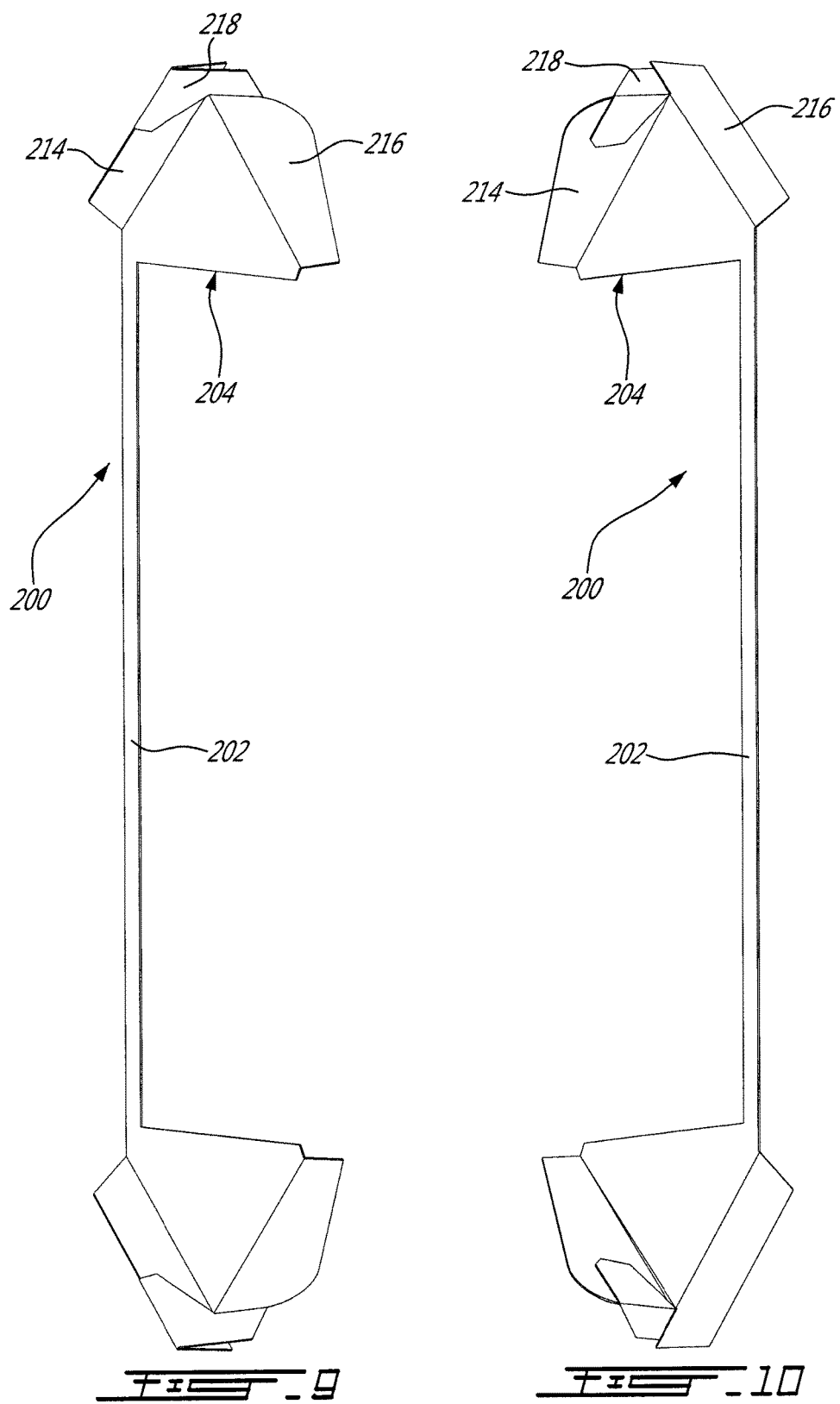

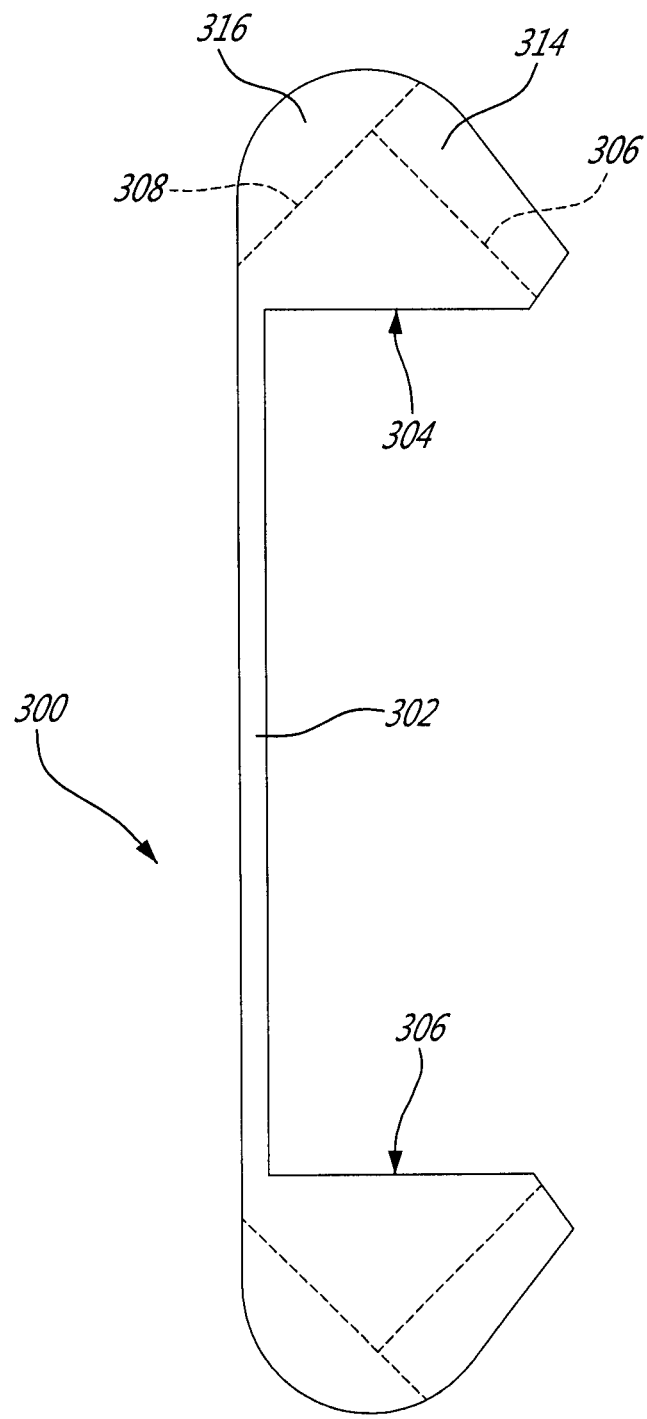

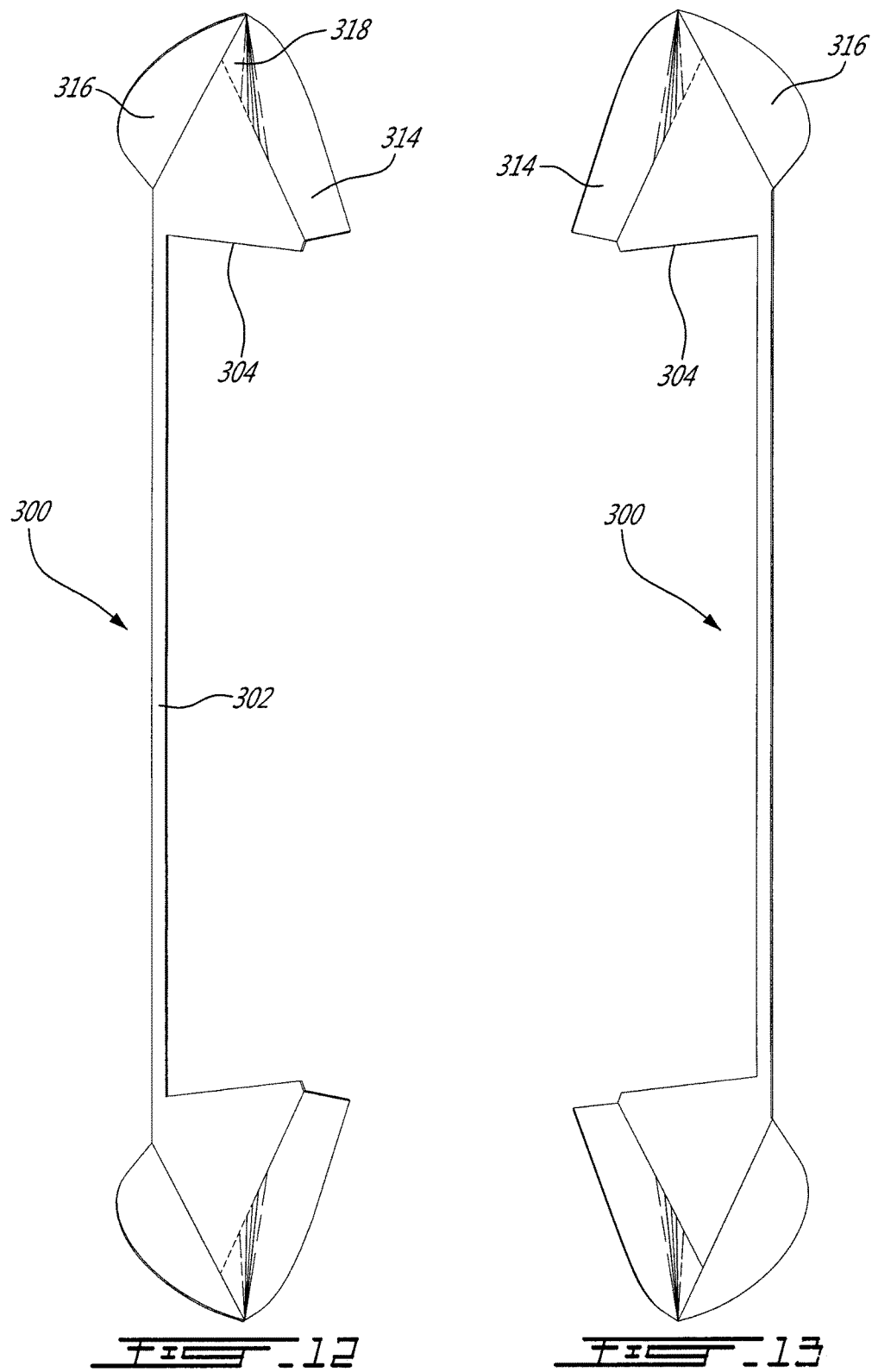

INTERPHASE INSULATOR

FIELD

The present disclosure generally relates to electric machines. More specifically, the present disclosure is concerned with an interphase insulator so configured as to be inserted in the rotor and/or stator slots of an electric machine.

BACKGROUND

Stators and rotors of electric machines are routinely made of a stack of laminations provided with coil receiving slots defined by projecting teeth therebetween. These slots need to be electrically insulated from the coils that are to be inserted therein. Insulating paper material has been developed for this purpose.

This insulating material is also provided between the different coils that are inserted in the same slot. More specifically, once a first coil is inserted in the slot, an interphase insulator, in the form of a layer of insulating material, is placed on top of the first coil before a second coil is inserted in the slot. The interphase insulator ensures that there is adequate electric insulation between the two or more coils sharing the slot.

The interphase insulator routinely includes projections that extend longitudinally there from to cover the coil heads and prevent contact between the coil heads of different phases that are inserted in different slots.

BRIEF DESCRIPTION OF THE DRAWINGS

In the appended drawings:

FIG. 3 is a top plan view of the interphase insulator of FIG. 2 shown in a folded configuration;

FIG. 4 is a bottom plan view of the interphase insulator of FIG. 2 shown in a folded position;

FIG. 8 is a top plan view of an interphase insulator according to a second illustrative embodiment; the interphase insulator being shown in an unfolded configuration;

FIG. 9 is a top plan view of the interphase insulator of FIG. 8 shown in a folded configuration;

FIG. 10 is a bottom plan view of the interphase insulator of FIG. 8 shown in a folded position;

FIG. 11 is a top plan view of an interphase insulator according to a third illustrative embodiment; the interphase insulator being shown in an unfolded configuration;

FIG. 12 is a top plan view of the interphase insulator of FIG. 11 shown in a folded configuration;

FIG. 13 is a bottom plan view of the interphase insulator of FIG. 11 shown in a folded position;

DETAILED DESCRIPTION

In accordance with an illustrative embodiment, there is provided an interphase insulator made of a insulating material and configured and sized to enter the longitudinal slot of an electric machine and to electrically insulate a first and a second coil from one another, the first and second coils each including two longitudinal legs and two opposite heads interconnecting the longitudinal legs; the interphase insulator comprising:

a longitudinal leg-insulating portion so configured and sized as to enter the longitudinal slot of the electric machine; and two head-insulating portions provided at opposite longitudinal ends of the leg-insulating portion; each head-insulating portion being provided with a first foldable tab so configured and sized as to align the head-insulating portion with the head of the coil.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "rear", "upwardly", "downwardly", etc. is used. It is to be understood that such terminology is used for ease of description and in a relative sense only and is not to be taken in any way as a limitation upon the scope of the present disclosure.

Other objects, advantages and features of the interphase insulator will become more apparent upon reading of the following non-restrictive description of illustrative embodiments thereof, given by way of example only with reference to the accompanying drawings.

Generally stated, illustrative embodiments of the present interphase insulator are concerned with electrically insulating material so foldable as to form an interphase insulator to insulate the coils belonging to different phases of a multiphase machine, the coils being inserted in the slots of the stator or rotor thereof.

Figure 1:
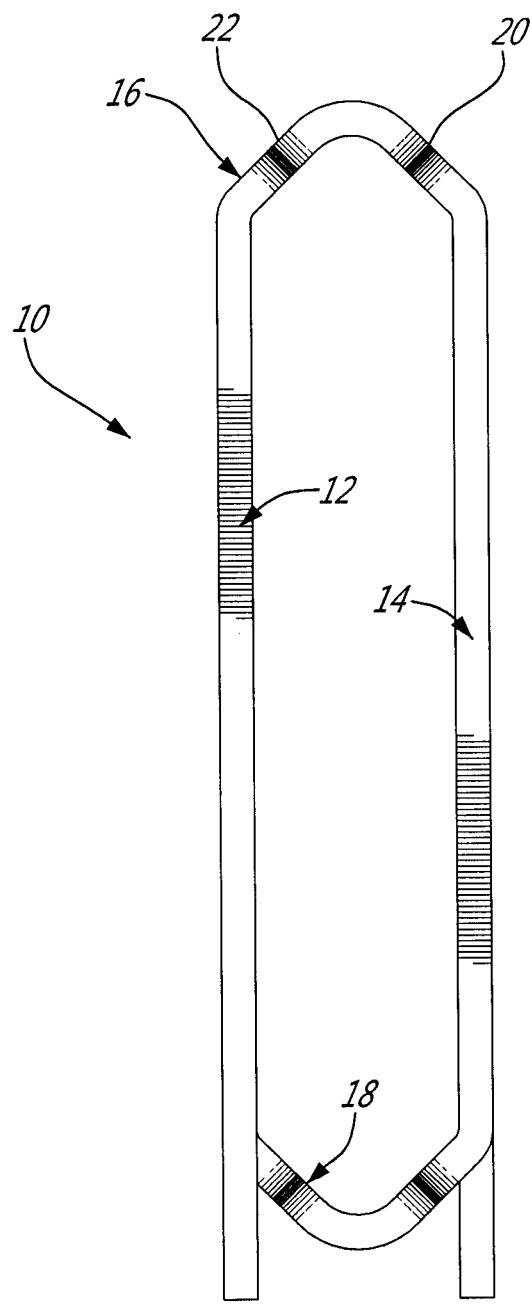
FIG. 1 is a top plan view of a prewound coil to be used in an electric machine
Figure 2:
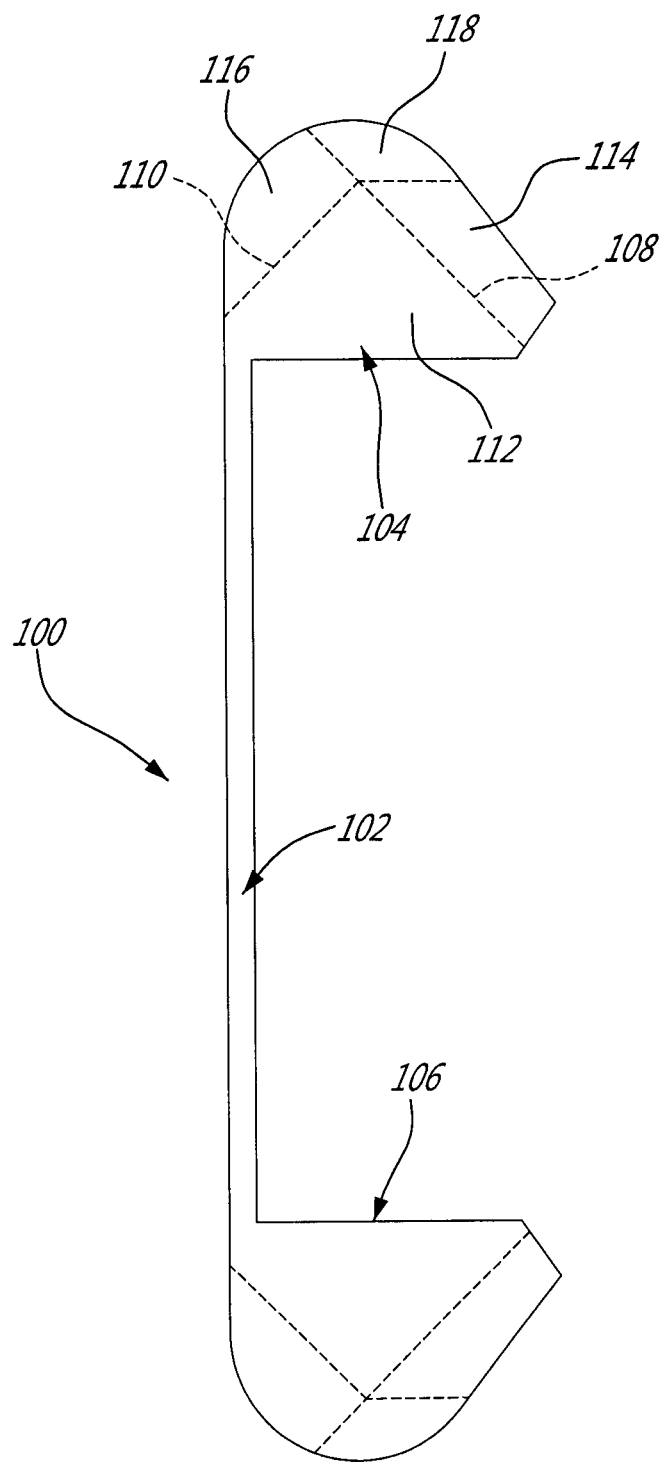
FIG. 2 is a top plan view of an interphase insulator according to a first illustrative embodiment; the interphase insulator being shown in an unfolded configuration.

FIG. 1 illustrates, in a top plan view, a prewound coil 10 made of rectangular wire, provided with first and second straight legs 12 and 14 configured and sized to enter the slots of the stator or rotor of a multiphase electric machine. The legs 12 and 14 are interconnected by head portions 16 and 18.

Turning now to FIGS. 2 to 7 of the appended drawings, a foldable interphase insulator 100 according to a first illustrative embodiment will be described.

The interphase insulator 100 includes a longitudinal leg-insulating portion 102 so configured and sized as to enter the longitudinal slot of the electric machine and two head-insulating portions 104 and 106 provided at opposite longitudinal ends of the leg-insulating portion and integral therewith.

The leg-insulating portion 102 is so configured and sized as to be inserted in the slot of an electric machine, between the legs of two different prewound coils stacked therein.

Since the two head-insulating portions 104 and 106 are identical, only head-insulating portion 104 will be described hereinbelow.

The head-insulating portion 104 includes first and second fold lines 108 and 110 that intersect each other and create a four zone head-insulating portion 104.

The generally triangular zone 112 is configured and sized to cover the head 16 of the coil 10.

The first foldable tab 114 covers an edge 20 (see FIG. 1) of the head 16 while the second foldable tab 116 is aligned with an edge 22 (see FIG. 1) of the head 16.

Finally, the junction portion 118 interconnects the other zones.

Figure 6:
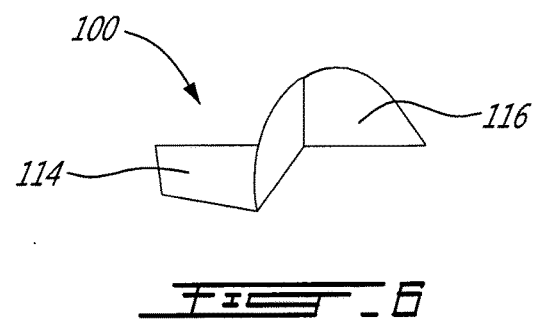
FIG. 6 is an end view of the interphase insulator of FIG. 2 shown in a folded configuration.

As can be better seen from FIGS. 3, 4 and 6, the first tab 114 and the second tab 116 are folded in opposite directions with respect to a plane defined by the triangular zone 112.

Figure 5:
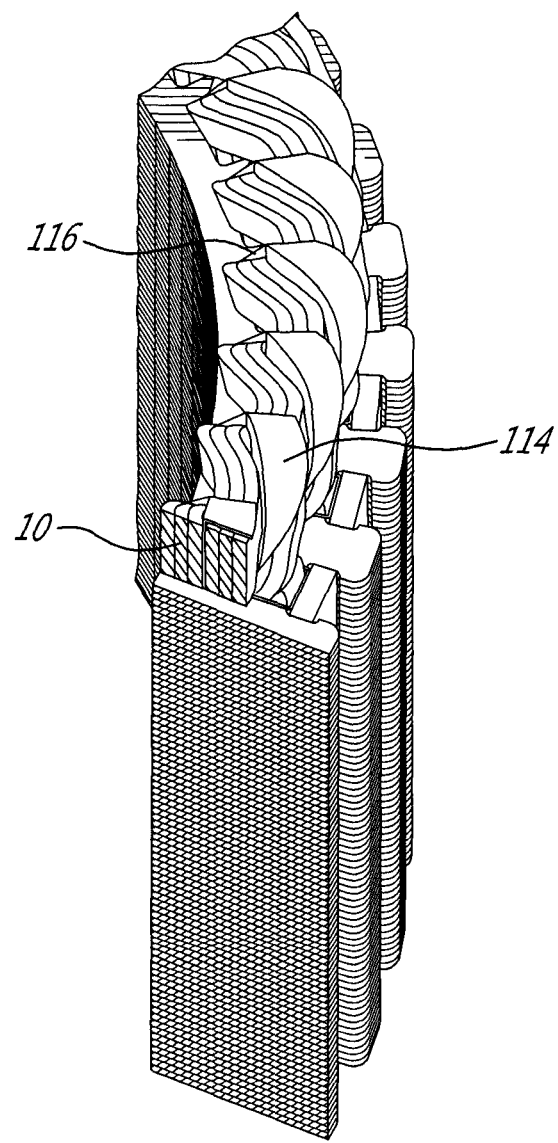
FIG. 5 is a perspective view of a portion of a stator provided with interphase insulators as illustrated in FIG. 2 and coils illustrated in FIG. 1.
Figure 7:
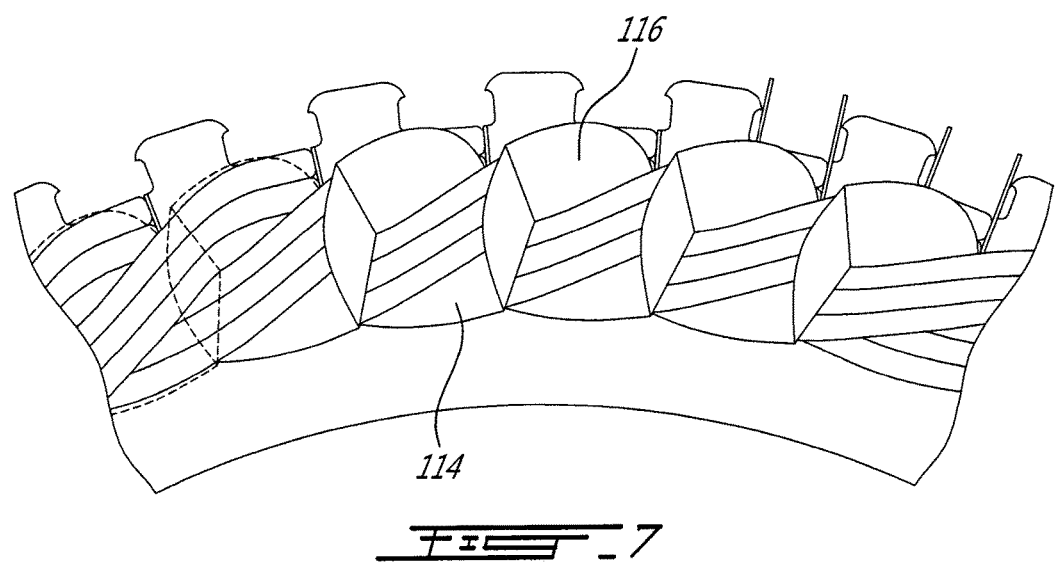
FIG. 7 is an end view of a portion of the stator of FIG. 5.

As can be seen from FIGS. 5 and 7 the tabs 114 and 116 cover the edges of adjacent prewound coils and therefore prevent electrical contact therebetween. Since the tabs 114 and 116 are folded along the fold lines, the insertion of the prewound coils in the slots does not force the head-insulating portion of the interphase insulator 100 to be uncontrollably deformed.

Turning now to FIGS. 8 to 10 of the appended drawings an interphase insulator 200 according to a second illustrative embodiment will be described. The interphase insulator 200 includes a leg-insulating portion 202 and two integral head-insulating portions 204 and 206. Again, since the head-insulating portions 204 and 206 are identical, only head-insulating portion 204 will be described hereinbelow.

The head-insulating portion 204 of the interphase insulator 200 includes three fold lines 206, 208, 210 and a cut 212.

The first fold line 206 defines a first tab 214, the second fold line 208 and the cut 212 define a second tab 216 and the third fold line 210 defines a locking portion 218 provided with a V-shaped notch 220.

To assemble the head-insulating portion, one folds the tab 214 via the fold line 214 in one direction and the tab 216 via the fold line 208 in an opposite direction. The locking portion may then be folded along line 210 and the V-shaped notch 220 may be inserted in the cut 212. This insertion stabilizes the folded tabs and helps the head portion to hold its folded shape.

The insertion of the interphase insulator 200 in the slot and the interaction with the coil is generally as mentioned hereinabove with respect to interphase insulator 100.

Turning now to FIGS. 11 to 13 of the appended drawings an interphase insulator 300 according to a third illustrative embodiment will be described. The interphase insulator 300 includes a leg-insulating portion 302 and two integral head-insulating portions 304 and 306. Again, since the head-insulating portions 304 and 306 are identical, only head-insulating portion 304 will be described hereinbelow.

The head-insulating portion 304 of the interphase insulator 300 includes two intersecting fold lines 306 and 308.

The first fold line 306 defines a first tab 314, the second fold line 308 define a second tab 316. It is to be noted that the intersection angle of the two fold lines is different than the one illustrated in FIG. 2 and that the first fold line 306 stops at the second fold line 308.

Accordingly, the angle difference and the stopping of the first fold line together makes the junction portion 318 (see FIG. 12) less defined than equivalent portion 110 of FIGS. 2 to 7.

The insertion of the interphase insulator 300 in the slot and the interaction with the coil is generally as mentioned hereinabove with respect to interphase insulator 100 and will therefore not be repeated for concision purpose.

Figure 14:
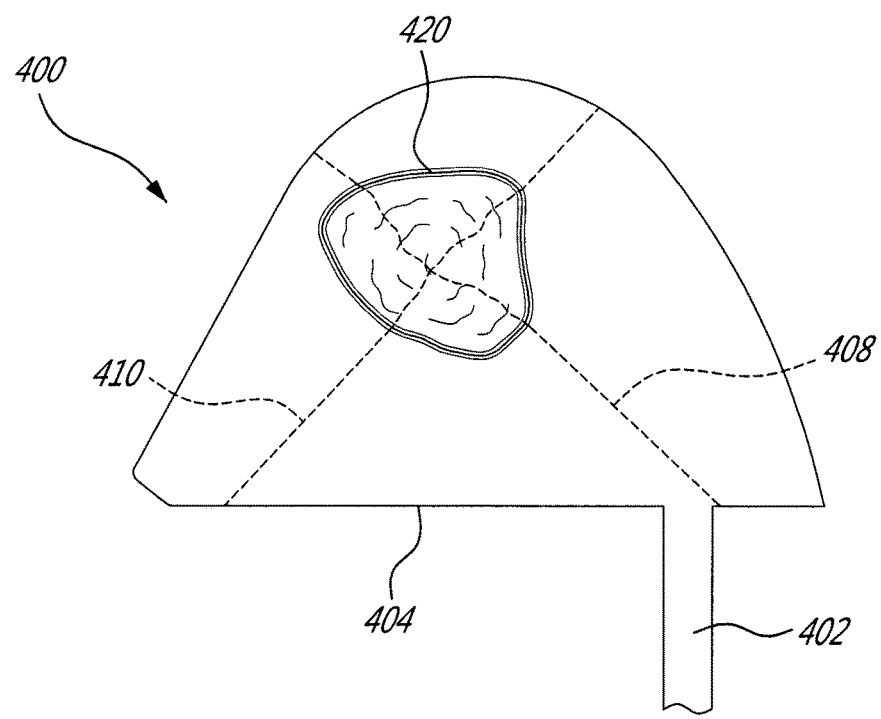
FIG. 14 illustrates a head-insulating portion according to a fourth illustrative embodiment.

Turning now to FIG. 14, there is provided an interphase insulator 400 according to a fourth illustrative embodiment. The interphase insulator 400 includes a leg-insulating portion 402 and two integral head-insulating portions 404 (only one shown). The head-insulating portion 404 includes two fold lines 408 and 410 similar to the fold lines 108 and 110 described hereinabove.

To even better conform to the shape of the head-insulating portion to the head of the coil, the head-insulating portion 404 is heated and pressed between the heads of two coils such as 10 to heat-shape a portion 420 of the head-insulating portion 404. Of course, a custom mold could be used to properly heat-treat and shape the head-insulating portion 404.

Figure 15:
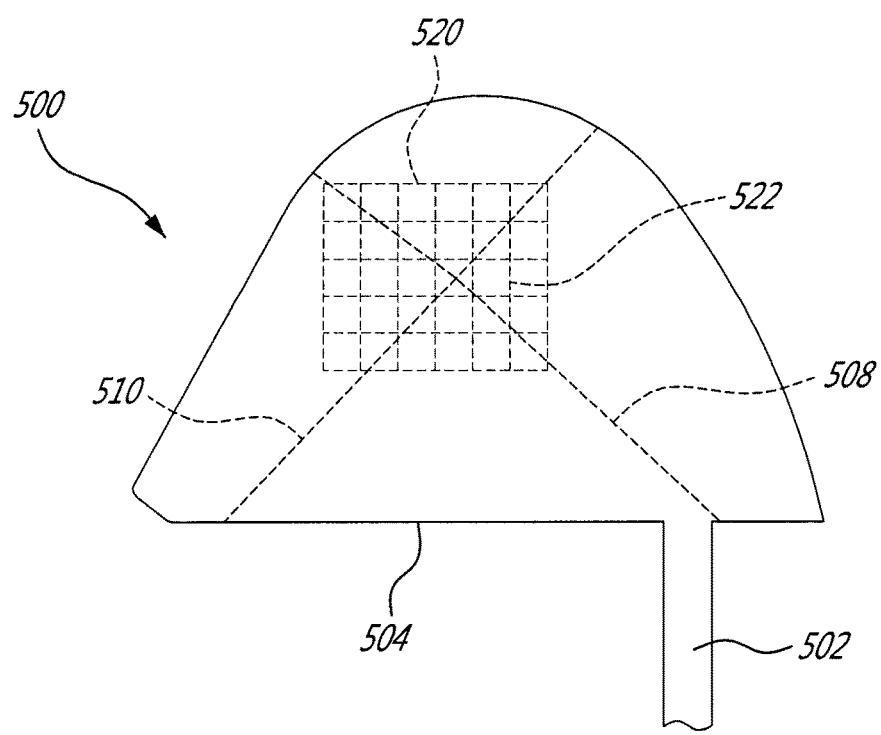
FIG. 15 illustrates a head-insulating portion according to a fifth illustrative embodiment.

Turning now to FIG. 15, there is provided an interphase insulator 500 according to a fifth illustrative embodiment. The interphase insulator 500 includes a leg-insulating portion 502 and two integral head-insulating portions 504 (only one shown). The head-insulating portion 504 includes two fold lines 508 and 510 similar to the fold lines 108 and 110 described hereinabove.

The head-insulating portion 504 is also provided with a plurality of crossing lines 520 and 522 that are indented in the insulating material to make this area more malleable. Indeed, when this area is more deformable, it better conforms to the shape of the coil head.

It is to be noted that the above-described operations could be manually performed by an operator or could be partially or totally automated.

It is to be noted that by using an interphase insulator that includes foldable tabs, the insertion of prewound coils made of rigid wire into the slots of an electric machine is facilitated. Indeed, should the fold lines be absent, the deformation of the head-insulating portions of the interphase insulator would be done by the pressure generated by the coil being inserted into the slot and onto the insulator. In this case the deformation would not be controlled and residual biasing forces would remain that would act on the coil heads. While these residual forces are small, their summation around the perimeter of the electric machine can cause slight deformation of the coil heads and/or interference between portions of the coils.

Furthermore, the use of fold lines creating tabs is interesting since it aligns the interphase insulators with the coil heads, creating a neater finished product.

It will also be apparent to one skilled in the art that the size and shape of the head-insulating portions 104, 106, 204, 206, 304, 306, 404 and 504 depend on the size and shape of the coil heads and could therefore be very different from the projections illustrated herein.

Similarly, while the two head-insulating portions of each interphase insulator have been shown as being identical, it is not a requirement thereof. As a non-limiting example, should the heads of the prewound coil be different, it could be interesting to provide head-insulating portions having different shapes.

One skilled in the art will understand that the fold lines can be pressed in the interphase insulator while it is die-cut or afterwards when it is installed.

It is also to be noted that while insulating paper material has been discussed as forming the interphase insulator, other suitable insulating material could be used.

It is to be noted that while the slots of the stator are outwardly projecting, other configurations of stator could benefit from the interphase insulator described herein.

It is also to be noted that while the interphase insulators have been illustrated and described hereinabove as being inserted in the stator slots of an external rotor electric machine, the interphase insulators could be used in a more conventional internal rotor electric machine (not shown). Similarly, while the interphase insulators have been illustrated and described hereinabove as being inserted in a stator, these interphase insulators could be used in a wound rotor (not shown).

It is to be understood that the interphase insulator is not limited in its application to the details of construction and parts illustrated in the accompanying drawings and described hereinabove. The interphase insulator is capable of other embodiments and of being practiced in various ways. It is also to be understood that the phraseology or terminology used herein is for the purpose of description and not limitation. Hence, although the interphase insulator has been described hereinabove by way of illustrative embodiments thereof, it can be modified, without departing from the spirit, scope and nature of the subject invention.

What is claimed is:

1. An interphase insulator made of an insulating material and configured and sized to enter the longitudinal slot of an electric machine and to electrically insulate a first and a second coil from one another, the first and second coils each including two longitudinal legs and two opposite heads interconnecting the longitudinal legs; the interphase insulator comprising:
   a longitudinal leg-insulating portion so configured and sized as to enter the longitudinal slot of the electric machine; and
   two head-insulating portions provided at opposite longitudinal ends of the leg-insulating portion; at least one head-insulating portion being provided with a first fold line defining a first foldable tab so configured and sized as to align the head-insulating portion with the head of the coil, a second fold line intersecting the first fold line and defining a second foldable tab, the first and second intersecting fold lines creating a three-zone head-insulating portion including the first and second foldable tabs and a triangular zone so configured as to cover the coil head.

2. The interphase insulator recited in claim 1, wherein the second fold line is aligned with a cut to define the second foldable tab and further comprising a third fold line defining a locking portion provided with a V-shaped notch.

3. The interphase insulator recited in claim 1, wherein the at least one head-insulating portion includes a heat-deformed portion.

4. The interphase insulator recited in claim 1, wherein the at least one head-insulating portion includes a plurality of crossing indented lines.

5. The interphase insulator recited in claim 1, wherein the longitudinal slot of the electric machine is provided in the stator of the electric machine.

6. The interphase insulator recited in claim 1, wherein the insulating material includes insulating paper material.

7. The interphase insulator recited in claim 1, wherein the leg-insulating portion and the two head-insulating portions are integral.

8. An interphase insulator made of an insulating material and configured and sized to enter the longitudinal slot of an electric machine and to electrically insulate a first and a second coil from one another, the first and second coils each including two longitudinal legs and two opposite heads interconnecting the longitudinal legs; the interphase insulator comprising:
   a longitudinal leg-insulating portion so configured and sized as to enter the longitudinal slot of the electric machine; and
   two head-insulating portions provided at opposite longitudinal ends of the leg-insulating portion; at least one head-insulating portion being provided with a first fold line defining a first foldable tab so configured and sized as to align the head-insulating portion with the head of the coil, a second fold line intersecting the first fold line and defining a second foldable tab, the first and second intersecting fold lines creating a four-zone head-insulating portion including the first and second foldable tabs, a triangular zone so configured as to cover the coil head, and a junction zone.

9. The interphase insulator recited in claim 8, wherein the at least one head-insulating portion includes a heat-deformed portion.

10. The interphase insulator recited in claim 8, wherein the at least one head-insulating portion includes a plurality of crossing indented lines.

11. The interphase insulator recited in claim 8, wherein the longitudinal slot of the electric machine is provided in the stator of the electric machine.

12. The interphase insulator recited in claim 8, wherein the insulating material includes insulating paper material.

13. The interphase insulator recited in claim 8, wherein the leg-insulating portion and the two head-insulating portions are integral.

* * * * *